Sept. 1, 1953 J. T. LATIMER 2,650,629
VENEER LATHE EMBODYING IMPROVED PRESSURE
BAR ACTUATING MECHANISM
Filed April 19, 1951 3 Sheets-Sheet 1
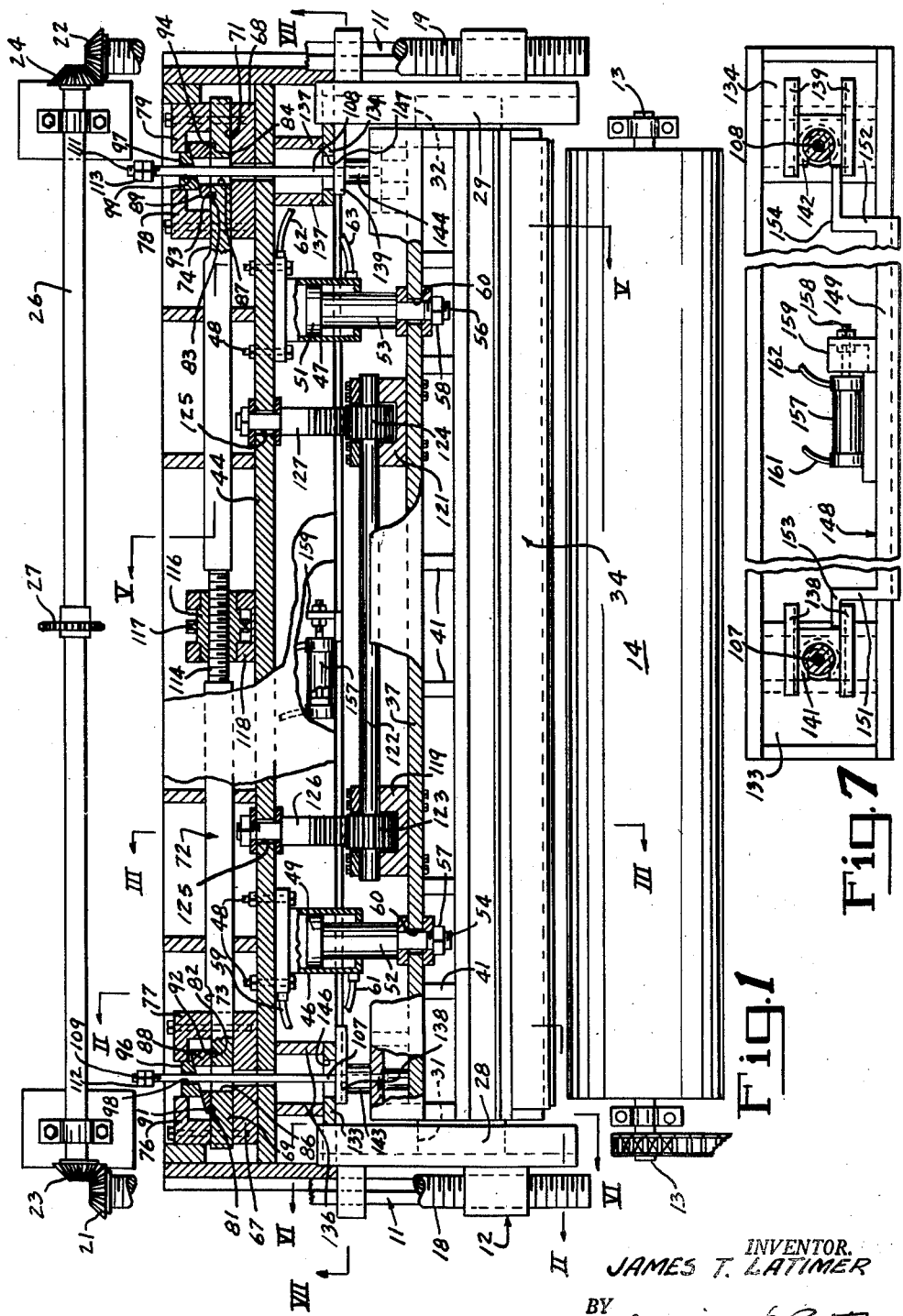
INVENTOR.
JAMES T. LATIMER
BY Jennings & Carter
ATTORNEYS

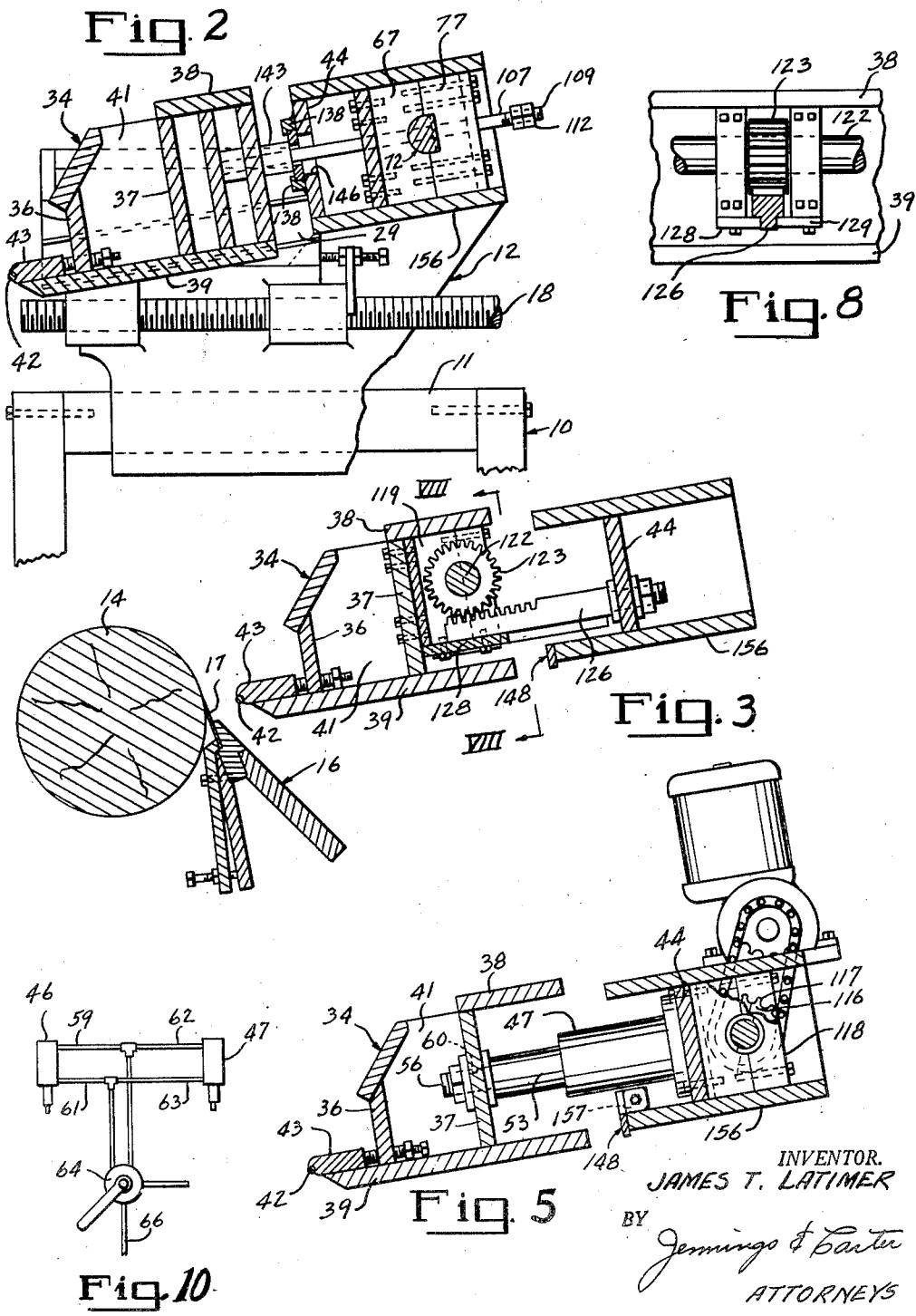

Sept. 1, 1953          J. T. LATIMER                    2,650,629
           VENEER LATHE EMBODYING IMPROVED PRESSURE
                      BAR ACTUATING MECHANISM
Filed April 19, 1951                            3 Sheets-Sheet 3
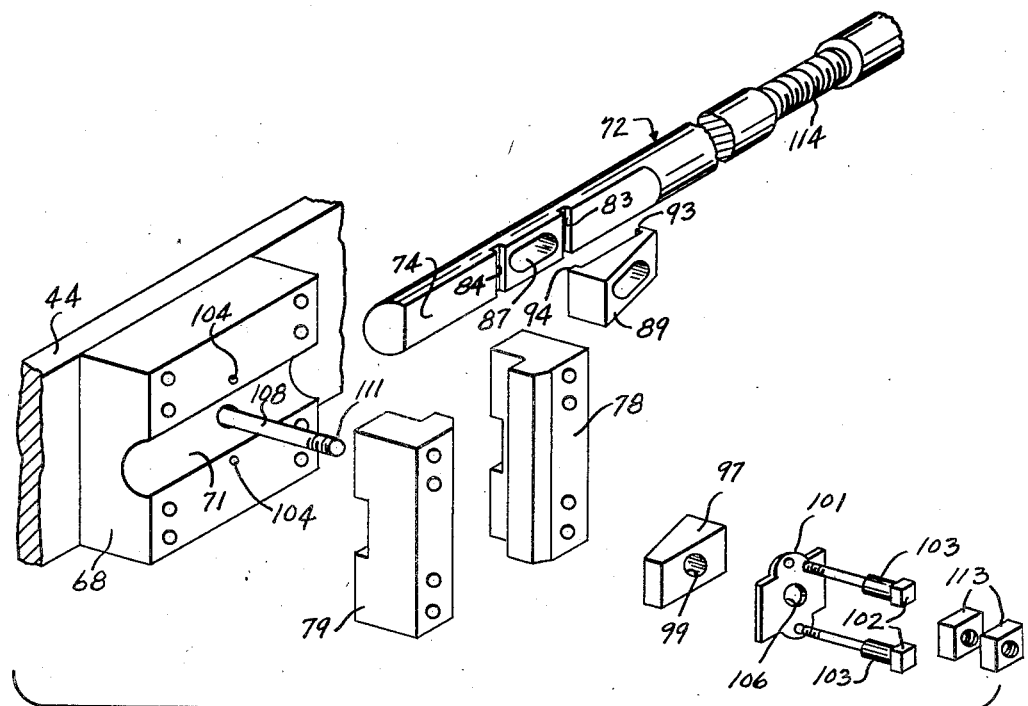
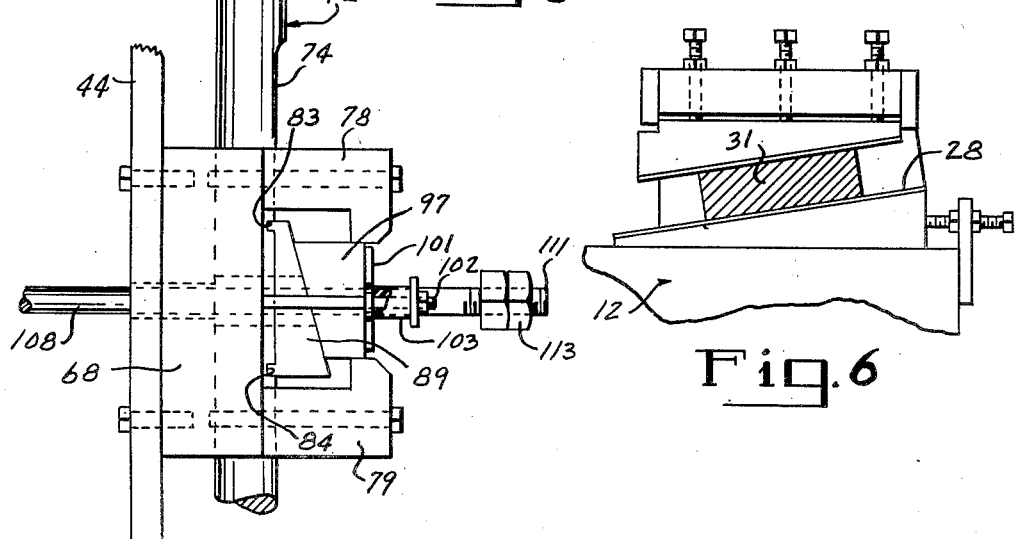
INVENTOR.
JAMES T. LATIMER
BY
Jennings & Carter
ATTORNEYS Patented Sept. 1, 1953

2,650,629

UNITED STATES PATENT OFFICE 2,650,629

VENEER LATHE EMBODYING IMPROVED PRESSURE BAR ACTUATING MECHANISM

James T. Latimer, Birmingham, Ala., assignor to Jackson Industries Inc., a corporation of Alabama Application April 19, 1951, Serial No. 221,865

11 Claims. (Cl. 144—213)

My present invention relates to veneer lathes, and to apparatus constituting an improvement on the general type of veneer lathe shown, described and claimed in my co-pending application, Serial No. 181,295, filed August 24, 1950, subject "Pressure Bar Support for Veneer Lathes."

An object of my invention is to provide a veneer lathe in which the pressure bar carriage is moved toward and from the lathe centers and the knife by means of fluid pressure cylinders, in conjunction with means operable independently of the cylinders to effect a micrometric adjustment of the pressure bar relative to the lathe centers, thus affording pressure bar supporting and adjusting means which is highly accurate, simple of construction, and reliable in operation.

More specifically, my invention contemplates a veneer lathe in which there is operatively interposed between the pressure bar carriage and a relatively stationary part of the lathe a pair of fluid pressure cylinders for moving the pressure bar carriage, together with a pair of wedge members operatively interposed between a member carried by the carriage and said stationary part of the lathe, whereby extremely accurate adjustment of the carriage relative to the centers is obtained, improving the quality of the veneer cut on such a lathe.

Another object is to provide a lathe embodying the features above mentioned and which also includes means for assuring that the pressure bar carriage moves forwardly toward the lathe centers with the contact edge of the bar precisely parallel to a line passing through the lathe centers, by this means assuring that the pressure bar bears evenly against a log in said centers along the entire length thereof.

Another object is to provide a veneer lathe embodying mechanism associated with the movable pressure bar carriage operable to limit the rearward movement of the carriage relative to the knife when said mechanism is in one position and operable when moved to another position to permit the carriage to be fully retracted, thus eliminating excessive travel of the carriage in normal veneer cutting operation and at the same time permitting its withdrawal from the knife for cleaning and sharpening of the knife.

In the above mentioned co-pending application I have shown, described and claimed a veneer lathe in which there was associated with the pressure bar carriage fluid pressure cylinders for moving the carriage toward and from a log in the lathe centers. The present invention is an improvement over the invention shown in the above identified application in several respects. While the lathe shown and described in the above mentioned application has proven in practice to be far superior to prior art lathes, the lathe to be described in this application is simpler of construction, more accurate in operation and generally better for the purpose at hand than the one mentioned in the application.

This invention differs from the one mentioned in my co-pending case in several important particulars. First, I have removed the micrometric adjusting mechanism completely away from the piston rods of the fluid pressure cylinders. This has considerably simplified the apparatus both from the manufacturing and operating standpoints and affords greater accuracy of movement and adjustment of the pressure bar carriage relative to the lathe centers. Second, I have provided means herein which is effective to automatically cause the pressure bar carriage to move forward evenly thus preventing its ends from tending to skew relative to the lathe centers. Third, I disclose herein mechanism which in normal operation of the lathe restricts the rearward movement of the pressure bar carriage. When it is desired to fully retract the carriage the mechanism just mentioned may be moved out of carriage movement limiting position, thus to permit the carriage to retract fully for the purpose of cleaning, sharpening, or changing the knife. In addition to the above mentioned changes there are other changes in the details of design which represent improvements over the veneer lathe disclosed in my co-pending application, all of which will become apparent as the description proceeds.

Apparatus illustrating the features of my invention is shown in the accompanying drawings forming a part of this application, in which:

Fig. 1 is a plan view, partly broken away and in section and showing a veneer lathe embodying my invention, the pressure bar carriage being in partially retracted position and with a log mounted in the lathe centers;

Fig. 2 is a transverse sectional view taken generally along line II—II of Fig. 1;

Fig. 3 is a detail sectional view taken generally along line III—III of Fig. 1;

Fig. 4 is a somewhat diagrammatic, perspective exploded view of one of the bearings and associated means for supporting one end of the axially movable wedge carrying shaft, the shaft and one of the wedge blocks being displaced laterally in the view for the sake of clarity;

Fig. 5 is a detail sectional view taken generally along line V—V of Fig. 1;

Fig. 6 is a detail sectional view taken generally along line VI—VI of Fig. 1;

Fig. 7 is a detail sectional view taken along line VII—VII of Fig. 1 and illustrating the carriage movement limiting mechanism;

Fig. 8 is a detail sectional view taken along line VIII—VIII of Fig. 3;

Fig. 9 is a fragmentary plan view, partly broken away and in section of one end of the wedge carrying, axially movable shaft and one of the associated bearing blocks and wedge means; made, Fig. 10 is a wholly diagrammatic piping diagram showing the conduits and valve for controlling the fluid pressure cylinders employed for moving the pressure bar carriage.

Referring now to the drawings for a better understanding of my invention, I have illustrated the same in association with a veneer lathe having a main frame 10. The main frame 10 is indicated diagrammatically as being provided with ways 11 on which is slidably mounted a main carriage indicated generally by the numeral 12. As is understood, the main carriage is slidable on the ways 11 toward and from the lathe centers 13 and toward and from a log 14 in the centers and from which the veneer is to be cut.

Mounted to move with the main carriage is a knife supporting structure 16 carrying an elongated cutting knife 17. The main carriage and therefore the knife 17 are fed inwardly at a regulated and predetermined rate by means of feed screws 18 and 19. The feed screws carry beveled gears 21 and 22 which mesh with other beveled gears 23 and 24 fixedly mounted on a cross shaft 26. The shaft 26 may be driven through a sprocket 27 by a chain, not shown, in turn driven in timed relation with the rotation of the log in conventional manner by means not shown.

Mounted on inclined supporting guides 28 and 29 are the projecting ends 31 and 32 of a pair of bars welded to each end of the pressure bar carriage. The pressure bar carriage is indicated generally by the numeral 34 and comprises transverse upright plates 36 and 37 and upper and lower substantially horizontal plates 38 and 39. The plates forming the pressure bar carriage are suitably braced by gusset plates 41, thus to form a rigid, built up carriage structure. At the front of the pressure bar carriage is the pressure bar proper 42 which may be in the form of a round rod. The bar 42 may be supported in a suitable holder 43, it being understood that the holder and pressure bar are equal substantially to the length of the knife.

The apparatus so far described is, generally speaking, old in the art. It will be understood that the in-feed for the entire main carriage, which carries the pressure bar carriage is through the medium of the feed screws 18 and 19, thus maintaining the knife at the correct position relative to the log from which the veneer is being cut and also maintaining the pressure bar at approximately the correct position relative to the log.

My invention comprises means for moving the pressure bar carriage toward and from the lathe centers relative to the main carriage and to means for obtaining a micrometric adjustment of the same relative to the lathe centers and knife. On the front side of a transverse plate 44, forming a part of the main carriage, I secure a pair of fluid pressure cylinders 46 and 47. These cylinders may be secured in any suitable manner as by bolting the bases thereof to the plate by bolts 48. The cylinders embody the usual pistons 49 and 51 having associated therewith piston rods 52 and 53, respectively.

The piston rods are provided with threaded ends 54 and 56 and the same are somewhat loosely secured by means of nuts 57 and 58 in suitable openings 60 provided for the ends of the piston rods in the vertically extending plate 37 of the pressure bar carriage structure. The openings 60 are made slightly larger than the threaded ends of the rods, providing for the necessary self alignment of the rods relative to the pressure bar carriage. The cylinders are provided with hydraulic lines 59—61 and 62—63 by means of which fluid may be admitted selectively to either end of the cylinders. As shown in Fig. 10, I may provide a four-way hydraulic valve 64 to which fluid under pressure from a line 66 may be admitted selectively to the ends of the cylinders, the fluid under pressure being supplied from a source, not shown.

Secured to the rear side of plate 44, near each end thereof are bearing blocks 67 and 68. The bearing blocks 67 and 68 have half-round seats 69 and 71 therein. Fitting in the seats are the ends of an axially movable shaft indicated generally by the numeral 72. The ends of the shafts are provided with flat sections 73 and 74. A pair of L-shaped cap blocks 76—77 and 78—79 are bolted to the blocks 67 and 68, thus to hold the shaft 72 slidably and non-rotatably in place within the bearing blocks.

Each of the flat ends 73 and 74 of the shaft 72 has vertical notches 81—82 and 83—84 therein. Between the sets of vertical notches are axially elongated holes 86 and 87. The holes 86 and 87 also are slightly larger in their minor dimension than the diameter of the rods 107 and 108, later to be described. Adapted to fit next to the plates on the ends of the shaft 72 are wedges 88 and 89 having sets of ribs 91—92 and 93—94 adapted to fit in the respective vertical notches in the shaft 72. Adapted to slidably cooperate with the wedges 88 and 89 are other wedges 96 and 97. The wedges 96 and 97 are provided with round openings 98 and 99 therethrough slightly larger in diameter than the rods 107 and 108, later to be described. The wedges 96 and 97 are held resiliently in place against the wedges 88 and 89 by means of plates 101. The plates are held in place by means of bolts 102 having interposed between the plates and the heads of the bolts lengths of resilient material such as rubber hose 103. The bolts 102 are threaded into suitable openings 104 in the outer face of the bearing blocks 67 and 68. The plates 101 are provided with centrally disposed holes 106 which are in alignment with the respective holes 98 and 99 of the blocks 96 and 97 and the elongated holes in the other wedge blocks and the ends of the shaft 72.

Projecting through the slots in the ends of the shaft 72, the slots in the wedge blocks 88 and 89 and the holes 98 and 99 of the wedge blocks 96 and 97, thence through the holes 106 in plates 101 are tension members in the form of a pair of rods 107 and 108. The rear ends of the rods 107 and 108 are threaded as indicated at 109 and 111 to receive lock nuts 112 and 113. The forward ends of the rods 107 and 108 are secured to the pressure bar carriage.

At the center of the shaft 72 is a threaded section 114. Threaded onto the section 114 is a split nut 116. The nut is provided about its periphery with sprocket teeth 117. Surrounding the nut 116 is a cage 118 fastened in suitable manner to the pressure bar carriage and which is effective to hold the nut against axial displacement.

Mounted on the rear side of the plate 37 of the pressure bar carriage are bearings 119 and 121. Rotatably journaled in the bearings 119 and 121 is a shaft 122. Fixedly secured to the shaft 122 are pinions 123 and 124.

Passing through slightly enlarged holes 125 in the plate 44 of the main carriage, and projecting forwardly therefrom are the rounded and threaded ends of rack bars 126 and 127 which are adapted to mesh with the pinions 123 and 124, respectively. As best seen in Fig. 8, the rack bars are T-shaped in transverse cross-section and the forward ends thereof are slidably supported by means of supports or guides 128—129 which are fastened to the lower sides of the bearing blocks 119 and 121, respectively.

Forwardly of the plate 44 forming a part of the main carriage are short inwardly extending plates 133 and 134. The plates 133 and 134 are suitably braced to the plate 44 by means of rearwardly extending plates 136 and 137. On the front side of the plates 133 and 134 are pairs of spaced apart horizontally disposed L-shaped guides 138 and 139. Slidably mounted in the guides are horseshoe shaped stop plates 141 and 142 disposed to straddle the tension rods 107 and 108. Secured to the rods 107 and 108, forwardly of the stop plates, are stop collars 143 and 144 of a diameter larger than the U-shaped openings in the stop plates. Rearwardly of the stop plates the short plates 133 and 134 are provided with openings 146 and 147 of a diameter to freely pass the stop collars 143 and 144 in a manner later to be explained.

The stop plates 141 and 142 are shiftable in unison in their guides by means of a common link bar 148. The bar 148 comprises a long horizontal central portion 149, vertical portions 151 and 152 near the ends thereof, and shorter horizontal portions 153 and 154 welded respectively in edgewise relation to the stop plates 141 and 142. Secured to the lower plate 156 forming a part of the main carriage is a fluid pressure cylinder 157. The piston rod 158 of cylinder 157 is connected to a bracket 159 carried by the central portion 149 of the link bar 148. The cylinder 157 is provided with lines 161 and 162 for the selective admission of fluid under pressure to either end of the cylinder.

From the foregoing the method of construction and using my improved veneer lathe may now be explained and understood. With the lathe assembled as indicated in the drawing it will be apparent that the feed screws 18 and 19, actuated through the common shaft 26 are effective to move the entire main carriage toward the log 14 in place in the centers of the lathe. This action moves the knife structure 16 carrying the knife 17 to the correct position to cut veneer of the desired thickness and this position is maintained by continuous in-feeding by the screws, it being understood that the log is power driven in the usual manner. With the knife set to cut the correct thickness of veneer, fluid is admitted to the rear ends of cylinders 46 and 47, forcing the pressure bar 42 into contact with the log, just above the point of engagement of the knife 17 therewith. As is well understood in the art the quality of veneer cut on a veneer lathe depends in large measure upon the maintenance of adequate pressure of the bar 42 against the log. During operation of the lathe fluid under pressure is maintained behind the pistons of the cylinders 46 and 47, holding the pressure bar carriage in its forwardmost position which, as will be appreciated from the description given, is limited by the engagement of the nuts 112 and 113 on the tension rods with the rear side of the wedge blocks 96 and 97. In the event the pressure developed by the pressure bar 42 against the log is too great or too small, by rotating nut 116 I move the shaft 72 axially, thereby causing the wedge blocks 88 and 89 to move axially. Since these blocks engage the respective wedge blocks 96 and 97, the latter being in contact with the nuts on the ends of the rods, I obtain a very fine, accurate and positive adjustment of the pressure bar pressure against the log. Thus, by shifting the shaft 72 to the left as viewed in Fig. 1, I can decrease the pressure of the pressure bar against the log and by moving it to the right as viewed in Fig. 1, I can increase the pressure. Adjustment for alignment purposes is obtained by means of the threaded ends 109 and 111 on the rods 107 and 108 and the nuts thereon.

It will further be noted that in its motion relative to the main carriage the pressure bar carriage is accurately under control of the pinion, shaft and rack arrangement illustrated. The effect of this apparatus is to cause the pressure bar carriage to move forwardly and backwardly with the leading edge of the pressure bar correctly aligned, that is, parallel to a line passing through the lathe centers. The movement of the carriage thus is not affected by inequalities of friction, inequalities of flow or fluid into the cylinders, or for other reasons, and hence always moves parallel to a line passing through lathe centers.

In normal operation it is only necessary to withdraw the pressure bar carriage a distance sufficient to permit a new log to be chucked in the centers. However, it is necessary when cleaning the knife, sharpening, or changing it to withdraw the carriage a farther distance. The cylinder 157 and the horseshoe stop plates 141 and 142 controlled thereby are effective, when in the position shown in Figs. 1 to 7, to limit the rearward movement of the pressure bar carriage relative to the main carriage. When it is necessary to withdraw the carriage farther I admit fluid to the left hand end of cylinder 157 as viewed in Fig. 7, moving the bar 148 to the right, hence withdrawing the stop plates from behind the enlargements or bosses 143 and 144 carried by the rods 107 and 108. In this position the bosses 143 and 144 are free to pass through the enlarged openings 146 and 147 of the plates 133 and 134, permitting the pressure bar carriage to move rearwardly to the full extent permitted by the strokes of the cylinders 46 and 47. The enlarged openings in the parts carried by the main carriage and through which the rods 107 and 108 pass as well as the enlarged openings for the piston rods ends and rack bar ends permit changes in elevation between the carriages without stress on the racks, rods 107 and 108 and piston rods.

From the foregoing it will be apparent that I have devised an improved pressure bar supporting and adjusting means for veneer lathes. In actual practice my invention has proven very satisfactory and the association of the wedge means with the tension rods 107 and 108 in the manner shown and described has proved to be a very efficient and simple way of affording micrometric adjustment of the pressure bar relative to the surface of the log. It will be understood that axial movement of the shaft 72 is, relatively speaking, very slight to produce the results desired. Also, by adjusting the nuts 112 and 113 on the rear ends of the rods I am enabled to accurately align the pressure bar relative to the knife and the centers of the lathe. Also, the flats on the ends of the shaft 72 coact with the bearings to hold the shaft against rotation.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The combination with a veneer lathe embodying a main carriage and a pressure bar carriage slidable forwardly relative to the main carriage, of a fluid pressure cylinder embodying relatively movable parts, means securing one of said relatively movable parts to a portion of the main carriage and the other thereof to a portion of the pressure bar carriage, means to admit fluid under pressure to one end of the cylinder thereby to move the pressure bar carriage forwardly away from the main carriage, a limit member carried by the pressure bar carriage operatively co-acting with a portion of the main carriage and by said co-action limiting forward movement of the pressure bar carriage relative to the main carriage, a slidable wedge member interposed between said limit member and said portion of the main carriage against which the limit member bears when the pressure bar carriage has moved forwardly, and means to slide the wedge member and thereby vary the distance between the pressure bar carriage and said main carriage.

2. The combination with a veneer lathe embodying a main carriage and a pressure bar carriage slidably mounted relative to the main carriage, of a pair of fluid pressure cylinders embodying relatively movable parts, said cylinders being spaced apart and disposed with the longitudinal axes thereof substantially normal to portions of the pressure bar carriage and main carriage, means securing one of the relatively movable parts of each cylinder to the pressure bar carriage and the other relatively movable parts thereof to the main carriage, means to admit fluid under pressure selectively to either end of the cylinders thereby to move the pressure bar carriage toward and from the main carriage, a pair of spaced apart members connected at one end to the pressure bar carriage and co-acting with the main carriage to limit the amount of movement of the pressure bar carriage away from the main carriage, slidable wedges interposed between the said members and a portion of the main carriage, and means to slide the wedge members in unison and thereby vary the distance between the pressure bar carriage and the main carriage after the pressure bar carriage is moved forwardly by the action of said cylinders.

3. The combination with a veneer lathe embodying a main carriage and a pressure bar carriage slidably mounted relative to the main carriage, a fluid pressure cylinder embodying relatively movable parts, means mounting the cylinder between the pressure bar carriage and main carriage with one of said parts secured to the pressure bar carriage and the other thereof secured to the main carriage, means to admit fluid under pressure to said cylinder and move the pressure bar carriage away from the main carriage, a member operatively connecting the pressure bar carriage and main carriage and limiting the relative movement apart of the same, a wedge member operatively interposed between the member and one of said carriages and engaged by the said member when the pressure bar carriage is moved away from the main carriage, and means to change the position of said wedge member and thereby vary the movement limiting effect of said member on the pressure bar carriage.

4. The combination with a veneer lathe embodying a main carriage and a pressure bar carriage slidably mounted for forward movement relative to the main carriage, a pair of spaced apart fluid pressure cylinders each embodying relatively movable parts, means mounting the cylinders between the pressure bar carriage and main carriage with one of said parts secured to the pressure bar carriage and the other thereof secured to the main carriage, means to admit fluid under pressure to said cylinders thereby to move the pressure bar carriage away from the main carriage, a pair of spaced apart tension members connecting the pressure bar carriage and main carriage and limiting the relative forward movement of the pressure bar carriage relative to the main carriage, wedge members interposed between the tension members and one of said carriages, and means to move the wedge members in unison and thereby vary the movement limiting effect of said tension members on the pressure bar carriage.

5. The combination with a veneer lathe of the type having a main carriage carrying a veneer knife together with a carriage carrying a pressure bar and slidably mounted on the main carriage for movement laterally thereof toward and from the knife, of means for accurately positioning the pressure bar relative to the knife comprising means to move the pressure bar carriage forwardly of the main carriage toward the knife, a member secured to one of the carriages and co-acting with the other thereof to limit forward movement of the pressure bar carriage, a wedge interposed between and engaged by the member and the other of said carriages, and means to shift the wedge thereby to vary the forward motion limiting effect of the member on the pressure bar carriage.

6. The combination with a veneer lathe of the type having a main carriage carrying a veneer knife together with a carriage carrying a pressure bar and slidably mounted on the main carriage for movement laterally toward and from the knife, of means to obtain micrometric adjustment of the forward position of the pressure bar relative to the knife comprising means to move the pressure bar carriage forwardly of the main carriage toward the knife, fluid pressure means operatively interposed between the carriage and exerting a separating force between the carriages when the pressure bar carriage is in forward position, a pair of laterally spaced apart tension members secured adjacent one end to one of said carriages and with the other ends slidable relative to portions of the other carriage, shiftable wedges interposed between the slidable ends of the tension members and the adjacent carriage, and means to shift the wedges in unison thereby to vary the forward position of the pressure bar carriage relative to the knife.

7. The combination with a veneer lathe of the type having a main carriage supporting a knife and a pressure bar carriage supported on the main carriage for movement relative thereto toward and from the lathe centers, of a pair of fluid pressure cylinders secured to the main carriage, pistons and piston rods in said cylinders, means securing the piston rods to the pressure bar carriage, means to admit fluid selectively to opposite sides of the pistons, a pair of spaced apart rods secured at one end to the pressure bar carriage and projecting slidably through a portion of the main carriage, shiftable wedges interposed between the slidable ends of the rods and the adjacent portion of the main carriage, non-slidable wedges carried by the main carriage and cooperating with the shiftable wedges, stops on the rods engageable with the associated non-slidable wedges and limiting movement of the pressure bar carriage toward the lathe centers in response to motion in that direction produced by the cylinders, an axially shiftable member to which the shiftable wedges are secured, and means to move the shiftable member axially in either direction.

8. Apparatus as defined in claim 7 in which said shiftable member is a shaft, and in which the means to move the same axially comprises a threaded section on the shaft, a nut on the threaded section, means to rotate the nut, and means to hold the nut against axial movement while the same is being rotated.

9. Apparatus as defined in claim 7 in which the non-slidable wedges are held resiliently in contact with the shiftable wedge members.

10. Apparatus as defined in claim 7 in which the stops on the ends of the rods are adjustable axially thereof.

11. The combination with a veneer lathe of the type having a main carriage supporting a knife and a pressure bar carriage supported on the main carriage for movement relative thereto toward and from the lathe centers, of a pair of spaced apart fluid pressure cylinders embodying pistons and piston rods, means securing the cylinders to the main carriage with the piston rods thereof extending toward the pressure bar carriage, means fastening the piston rods to the pressure bar carriage, a shaft extending substantially parallel to the longitudinal axis of the main carriage, spaced bearings on the main carriage having seats receiving the shaft and supporting it for axial movement, means to shift the shaft axially, a pair of elongated rods secured at one end to the pressure bar carriage and projecting slidably through the seats of the bearings, there being axially elongated openings in the shaft through which the rods project, wedges secured to the shaft and having tapered surfaces thereon, other wedges having complementarily tapered surfaces coacting with the tapered surfaces of the first named wedges, means holding the second named wedges against lateral shifting, there being openings in said other wedges through which the ends of said rods project, means holding the said other wedges resiliently in contact with the first named wedges, and stop means on the ends of said rods operatively engageable with said other wedge means and liming forward movement of the pressure bar carriage in response to motion in that direction produced by the cylinders.

JAMES T. LATIMER.

References Cited in the file of this patent

UNITED STATES PATENTS

| Number | Name | Date |
|---|---|---|
| 9,286 | Smith | Sept. 28, 1852 |
| 663,847 | Bancroft | Dec. 18, 1900 |
| 1,471,450 | Collier | Oct. 23, 1923 |
| 1,646,115 | Sjostrom | Oct. 18, 1927 |
| 2,340,532 | Jackson | Feb. 1, 1944 |
| 2,562,472 | Miller et al. | July 31, 1951 |